Oct. 8, 1968 W. A. BOOTHE 3,404,700

LIQUID LEVEL CONTROL MEANS

Filed Oct. 5, 1964

INVENTOR.
WILLIS A. BOOTHE
BY James E Espe
HIS ATTORNEY

United States Patent Office 3,404,700

Patented Oct. 8, 1968

3,404,700

LIQUID LEVEL CONTROL MEANS

Willis Anson Boothe, Scotia, N.Y., assignor to General Electric Company, a corporation of New York Filed Oct. 5, 1964, Ser. No. 401,341

5 Claims. (Cl. 137—81.5)

This invention relates generally to liquid level control means and, more particularly, to such means employing a fluid amplifier.

There are, of course, many applications for liquid level control means and one example, as used herein, is in the automatic washing machine art. An automatic washing machine undergoes many "fills" of liquid, during a single washing operation, wherein the machine is filled to a suitable level with liquid, operated, drained of liquid and subsequently refilled with liquid. It is important that reliable means be provided to control the admission of liquid into the machine to assure that a sufficient quantity is provided to achieve desired wash results; however, at the same time it is important that an excessive amount of liquid be avoided so that overloading of the machine and/or flooding is prevented. There are many devices commercially available today which will achieve the above-mentioned desiderata; however, some are prohibitively expensive and others are excessively unreliable for use in the highly competitive home appliance industry. Therefore, it would be desirable to provide an improved liquid level control for use in an automatic washing machine which is comparatively inexpensive to manufacture but reliable in operation.

Accordingly, it is an object of this invention to provide an improved liquid level control means.

It is another object of this invention to provide a liquid level control means which is relatively inexpensive to manufacture but which provides comparatively reliable operation.

It is also an object of this invention to provide a liquid level control means which advantageously employs a fluid amplifier.

Briefly stated, in accordance with one aspect of the present invention, there is provided an automatic washing machine having therein a wash chamber or container which requires a predetermined level of liquid for proper washing operation. Fluid conducting means extend into the wash chamber and have an open terminal end at approximately the desired level of the liquid. A fluid amplifier is also provided and has a main inlet communicating with a source of liquid under pressure, at least one outlet communicating with the wash chamber and a control inlet communicating with the aforementioned fluid conducting means. The fluid amplifier is designed so that fluid entering the main inlet will exit through the outlet when the control inlet is unrestricted and thereby free to aspirate air. When the liquid level within the wash chamber reaches the fluid conducting means, aspiration through the control inlet is restricted and this causes the fluid amplifier to switch the fluid entering the main inlet out through a vent or second outlet rather than the outlet communicating with the wash chamber.

While the specification concludes with claims particularly pointing out and distinctly claiming the subject matter which is regarded as the invention, it is believed the invention will be better understood from the following description taken in connection with the accompanying drawing, in which:

Figure 1:
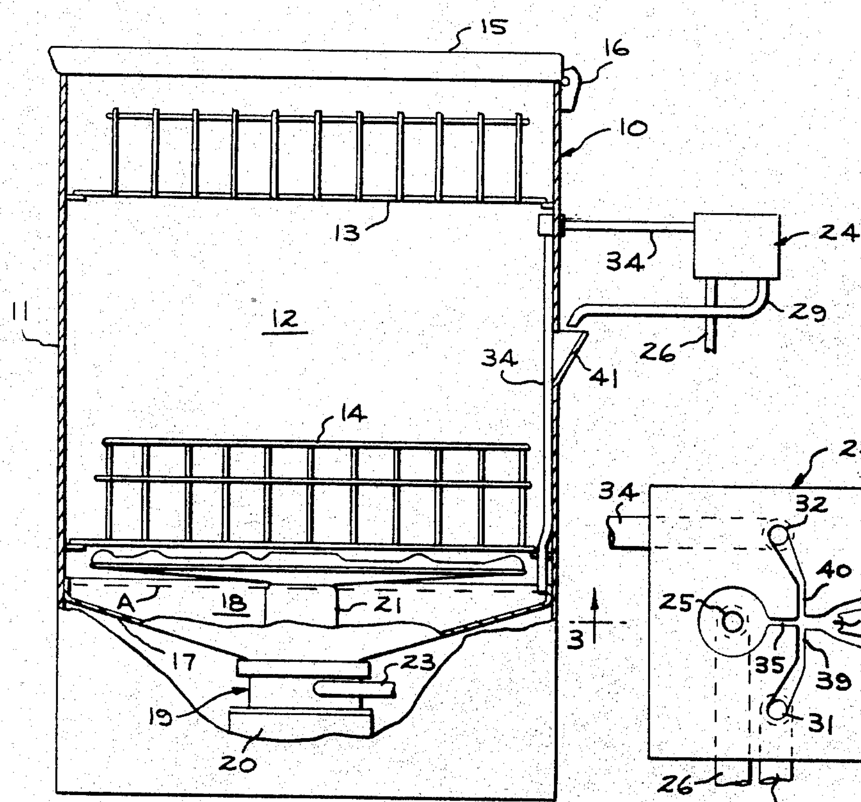
FIGURE 1 is an elevational view, partially cut away to show details, of an automatic washing machine with which the present invention may be employed.

Referring now to the drawing, and particularly to FIGURE 1 thereof, an automatic washing machine in the form of an automatic dishwasher 10 is illustrated and includes an outer cabinet 11 defining therein a wash chamber, or container, 12. Disposed within wash chamber 12 are dish-supporting racks 13 and 14 which are adapted to receive and support dishes to be washed within chamber 12. Access to chamber 12 is provided by means of a closure member or door 15 which is provided in one wall of cabinet 11 and which is pivotally secured thereto by means of a hinge 16.

The lower extremity of wash chamber 12 is defined by a bottom wall 17 which has a centrally depressed portion forming a sump 18. Positioned within sump 18 and supported by bottom wall 17 is a motor-pump assembly 19 which includes an electrically-reversible motor 20 and a pump 21. Pump 21 may be directly mechanically linked to motor 20 so that, when motor 20 is operated in one direction of rotation, pump 21 is rotated to withdraw wash fluid from sump 18 and propel it upwardly through a rotatable reaction-type spray arm 22 from which the fluid is sprayed to generate a wash action within wash chamber 12. In the other direction of rotation of motor 20, pump 21 is rotated to withdraw wash fluid from sump 18 and propel it out through an effluent discharge conduit 23 which communicates with a normal household sewer system (not shown).

Suitable sequence control means (not shown) may be provided to control the electrical energization of the motor 20 as well as any other electrical components necessary to carry out the washing operation of dishwasher 10. Normally, an electrically-operated solenoid valve (not shown) is provided to operate in response to the sequence control means to control the admission of water to wash chamber 12. The solenoid-operated valve is a relatively expensive item in itself and, moreover, further requires a switch operated by the sequence control means to energize or de-energize the valve. Additionally, a solenoid-operated valve provides no flood control or prevention since it is not responsive to the liquid level within the washing machine.

In accordance with the present invention, relatively inexpensive means are provided to obviate the solenoid-operated valve and provide the additional advantage of an inherent flood prevention feature. This means includes a fluid amplifier 24 having a main inlet 25 which may communicate with the normal household plumbing system by means of a conduit 26. Fluid amplifier 24 further includes a first outlet 27 and a second outlet 28, the first outlet 27 communicating with a conduit 29 while outlet 28 communicates with a conduit 30. A first control inlet 31 and a second control inlet 32 are, respectively, in communication with fluid conducting means or conduits 33 and 34.

Figure 2:
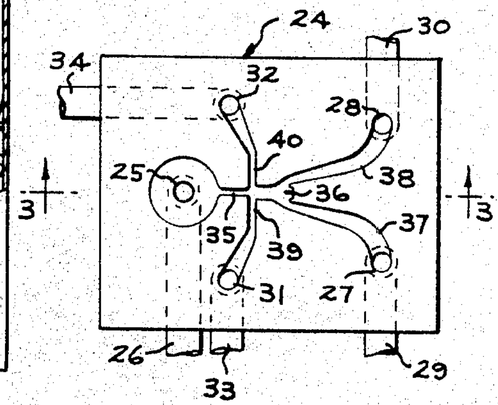
FIGURE 2 is an enlarged view of the fluid amplifier and the connecting conduits comprising a part of the present invention.
Figure 3:
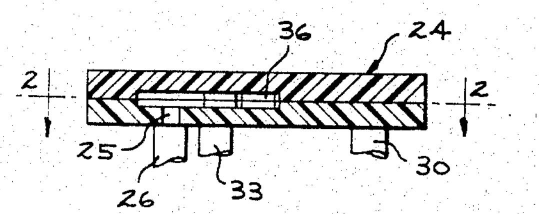
FIGURE 3 is a sectional view taken along line 3—3 of FIGURE 2.

Fluid amplifiers, of the type illustrated in FIGURE 2, which is the type utilizing a side control jet to deflect a main fluid flow into one of several branch passages, are well known. In this type of device a main flow passageway is connected to a chamber from which branch passageways lead off. At the point where the main flow enters the chamber, side ports for passage of control fluid transverse to the main flow are provided which, by selectively allowing such control fluid to flow, will control the main flow by deflecting it into the desired branch passage. These devices are therefore referred to as fluid amplifiers due to the fact that a small control fluid flow may be utilized to control the flow of a large fluid stream. Naturally an advantage of such control devices is the fact that the momentum of the primary flow stream is preserved and any pressure drop across the device is quite small. In addition, such devices may be made to be bi-stable, that is once the primary stream is deflected to flow through a branch stream, the boundary layer effect between this stream and the flow passage walls tend to lock the primary stream to flow in this direction.

Referring again to FIGURE 2, conduit 26, as discussed above, communicates with the conventional household plumbing system so that water is supplied to inlet 25 under substantial pressure and potential mass flow. Water entering through inlet 25 passes through a passageway 35 and into a chamber 36. From chamber 36 the water may exit through passageway 37 and then out through the first outlet 27 or it may exit from chamber 36 through passageway 38 and then out through the second outlet 28. As is well known in the fluid amplifier art, control inlets 31 and 32 communicate with chamber 36 by means of passageways 39 and 40 respectively. A jet of control fluid may be applied to chamber 36 by either of passageways 39 or 40. In the most common arrangement, when a control jet enters chamber 36 from passageway 39 simultaneously with the main fluid flow from passageway 35, the resulting mixture exits from chamber 36 through passageway 38. Chamber 36 and its adjoining passageways may be so designed so that under the foregoing conditions, virtually no fluid will exit through passageway 37. Along the same lines, if a control jet is introduced into chamber 36 from passageway 40 and, if chamber 36 and the adjoining passageways have been so designed, no fluid will exit through passageway 38.

The fluid amplifier may be designed so that, instead of applying a positive control jet by means of either of passageways 39 or 40, it is possible to control the flow of fluid by letting the main fluid entering chamber 36 through passageway 35 aspirate the control fluid through either passageway 39 or 40. With this arrangement, if control inlet 31 is closed and control inlet 32 opened, fluid entering through inlet 25 and passing through passageway 35 into chamber 36, will aspirate fluid through passageway 40 and the resulting mixture will exit through passageway 37. Similarly, if control inlet 32 is closed and control inlet 31 is opened, the resulting mixture will exit from chamber 36 through passageway 38.

Referring again to FIGURE 1, it can be seen that conduit 34 interconnects control inlet 32 with wash chamber 12 and extends down into wash chamber 12 to terminate at the level to which it is desired to fill wash chamber 12 with water prior to operating dishwasher 10. This level indicated by a dotted line A. Conduit 29 interconnects outlet 27 to wash chamber 12 through an inlet funnel 41. Accordingly, if conduit 26 is connected to a water source such as the normal household plumbing system, water will enter fluid amplifier 24 through main inlet 25, flow through passageway 35 into chamber 36 and, if control inlet 31 is closed, aspirate air from wash chamber 12 through conduit 34 in a manner such that the resulting mixture will exit from chamber 36 through passageway 37 and eventually be channeled into wash chamber 12 by means of conduit 29. This situation will obtain until the water level within wash chamber 12 reaches the terminal end of conduit 34 whereupon the suction present in conduit 34, due to the aspirating effect within fluid amplifier 24, will tend to lift water from chamber 12 up through conduit 34. Of course, as the water rises in conduit 34 the aspirating effect of the water passing through passageway 35 will be overcome. This in effect closes control port 32 so that the water entering chamber 36 from passageway 35 is switched to exit through passageway 38 rather than passageway 37. Since the water is no longer passing through conduit 29, the admission of water into chamber 12 is thus terminated.

Conduit 30 may communicate with a signal device to indicate to the user of the dishwasher that the water supply should be turned off or it may communicate with a second automatic washing machine whereby the second washing machine is subsequently filled with liquid following a sequence of events similar to those discussed above. If desired, conduit 30 may also communicate with the sequence control means in dishwasher 10 to initiate the subsequent step in the operation of the dishwasher.

It should be realized, of course, that the precise configuration of fluid amplifier 24 may vary somewhat from that illustrated in FIGURE 2. For example, vent means may be provided in chamber 36 to provide an exit for fluids in the event that either of the outlet ports become blocked or closed. Also, control inlet 31, passageway 39 and conduit 33 may be deleted altogether if the fluid amplifier is modified slightly to operate in a manner whereby the main fluid stream can be switched from one outlet to the other simply by opening or closing control inlet 32. This can be accomplished by increasing the setback of the wall in which passageway 39 is located. Thus, as flow leaves passageway 35 and enters chamber 36, it will cling to the wall in which passageway 39 is located as long as conduit 34 is aspirating. When aspiration is prevented by the rising fluid level in wash chamber 12, flow will switch to the opposite wall of chamber 36 since, in the absence of aspiration, flow will tend to attach to the closer of the two side walls as long as the rest of the internal geometry of the fluid amplifier is correct. It is possible to accomplish this "single-sided" operation by other geometric changes as well.

Thus it can be seen that the present invention provides a relatively inexpensive, though reliable, liquid level control means especially suitable for use in an automatic washing machine although certainly not limited in its application to such use. The fluid amplifier illustrated costs only a fraction of the cost of a solenoid-operated valve and, at the same time, has no moving parts subject to wear and eventual malfunction.

As will be evident from the foregoing description, certain aspects of the invention are not limited to the particular details of construction of the example illustrated, and it is contemplated that other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. Means to control the liquid level in a container comprising:

(a) a fluid amplifier having a main inlet, a control inlet and an outlet, (b) said main inlet communicating with a source of liquid under pressure, (c) said outlet communicating with the container in fluid dispensing relation thereto, (d) said control inlet communicating with the container at substantially the level at which the liquid is to be controlled.

2. Means to control the liquid level in a container comprising:

(a) a fluid amplifier having a main inlet, a control inlet and an outlet, (b) said main inlet communicating with a source of liquid under pressure, (c) said outlet communicating with the container in fluid dispensing relation thereto, (d) said control inlet communicating with the container at substantially the level at which the liquid is to be controlled, (e) said main inlet, said control inlet and said outlet being arranged so that liquid entering said main inlet will exit through said outlet as long as said control inlet is unrestricted.

3. Means to control the liquid level in a container comprising:

(a) a fluid amplifier having a main inlet, a control inlet, first outlet and a second outlet, (b) said main inlet communicating with a source of liquid under pressure, (c) said first outlet communicating with the container in fluid dispensing relation thereto, (d) said control inlet communicating with the container at substantially the level at which the liquid is to be controlled, (e) said main inlet, said control inlet, said first outlet and said second outlet being arranged so that liquid entering said main inlet will exit through said first outlet as long as said control inlet is unrestricted, (f) said main inlet, said control inlet, said first outlet and said second outlet being further arranged so that the fluid will exit through said second outlet as long as said control inlet is restricted.

4. Means to control the liquid level in a container comprising:

(a) a fluid amplifier having:
  (aa) a main inlet,
  (bb) a control inlet,
  (cc) a first outlet, and
  (dd) a second outlet, (b) means interconnecting said main inlet with a source of liquid under pressure, (c) means interconnecting said first outlet with the container whereby any liquid exiting from said fluid amplifier through said first outlet will be dispensed into the container, (d) fluid conducting means interconnecting said control inlet with the container, (e) said fluid conducting means having an open terminal end within the container at substantially the height which provides the desired level of liquid within the container, (f) said fluid amplifier being configurated to normally exit any liquid entering through said main inlet out through said first outlet and thus into the containers as long as said fluid conducting means is free to aspirate air, (g) said fluid amplifier being further configurated to normally exit any liquid entering through said main inlet out through said second outlet as long as said fluid conducting means is restricted and thereby prevented from aspirating air.

5. Means to control the liquid level in a container comprising:

(a) a fluid amplifier having:
  (aa) a main inlet,
  (bb) a control inlet,
  (cc) a first outlet, and
  (dd) a second outlet, (b) means interconnecting said main inlet with a source of liquid under pressure, (c) means interconnecting said first outlet with the container whereby any liquid exiting from said fluid amplifier through said first outlet will be dispensed into the container, (d) fluid conducting means interconnecting said control inlet with the container, (e) said fluid conducting having an open terminal end within the container at substantially the height which provides the desired level of liquid within the container, (f) said fluid amplifier being configurated to normally exit any liquid entering through said main inlet out through said first outlet and thus into the container as long as said fluid conducting means is free to aspirate air, (g) said fluid amplifier being further configurated to normally exit any liquid entering through said main inlet out through said second outlet as long as said fluid conducting means is restricted and thereby prevented from aspirating air, (h) the terminal end of said fluid conducting means being situated to become submerged and thereby restricted against aspiration as the level of liquid within the container reaches the terminal end.

References Cited

UNITED STATES PATENTS

| | | | |
|---|---|---|---|
| 3,001,539 | 9/1961 | Hurvitz | 137—81.5 |
| 3,072,147 | 1/1963 | Allen et al. | 137—81.5 |
| 3,148,691 | 9/1964 | Greenblott | 137—81.5 |
| 3,171,421 | 3/1965 | Joesting | 137—81.5 |
| 3,187,763 | 6/1965 | Adams | 137—81.5 |
| 3,244,370 | 4/1966 | Colston | 137—81.5 X |
| 3,267,949 | 8/1966 | Adams | 137—81.5 |

SAMUEL SCOTT, *Primary Examiner.*